F. H. BITTNER.
ADJUSTABLE REACH.
APPLICATION FILED AUG. 14, 1920.
1,393,661.
Patented Oct. 11, 1921.
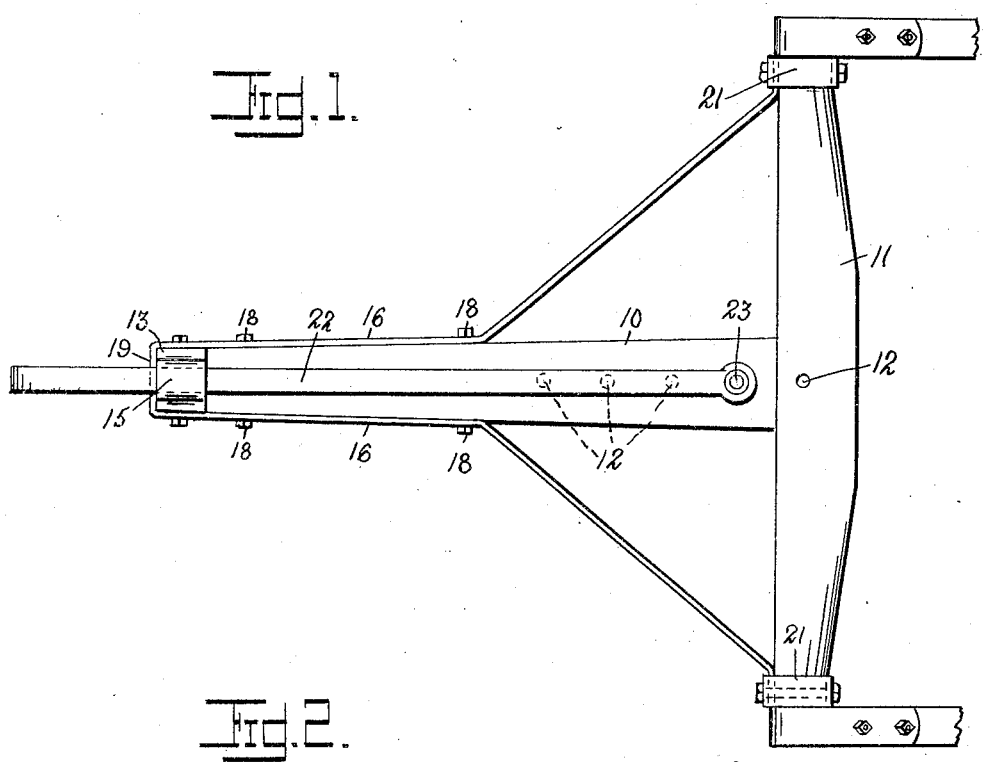
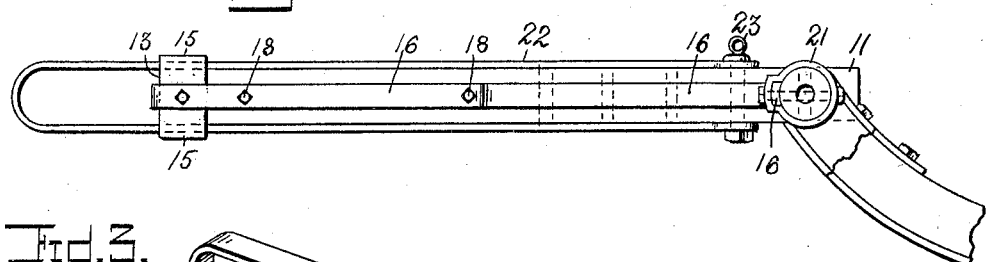
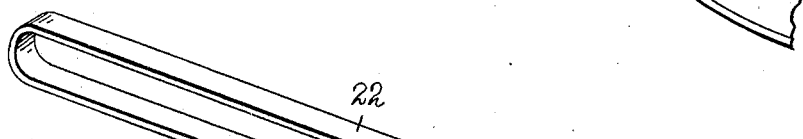
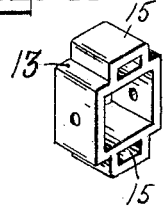
Inventor
F. H. Bittner.
By Geo. P. Kimmel
Attorney

UNITED STATES PATENT OFFICE.

FRED H. BITTNER, OF BOTTINEAU, NORTH DAKOTA.

ADJUSTABLE REACH.

1,393,661.     Specification of Letters Patent.     Patented Oct. 11, 1921.

Application filed August 14, 1920. Serial No. 403,445.

*To all whom it may concern:*

Be it known that I, FRED H. BITTNER, a citizen of the United States, residing at Bottineau, in the county of Bottineau and State of North Dakota, have invented certain new and useful Improvements in Adjustable Reaches, of which the following is a specification.

This invention relates to the reach portions of vehicles, more particularly to the reaches of sleighs, and has for one of its objects to provide a simply constructed device whereby the reach may be lengthened or shortened as required without detaching or discarding any of the parts.

With these and other objects in view, the invention consists in certain novel features of construction as hereinafter shown and described and then specifically pointed out in the claim, and in the drawings illustrative of the preferred embodiment of the invention, Figure 1 is a plan view.

Fig. 2 is a side elevation.

Fig. 3 is a perspective view of the guide member, detached.

Fig. 4 is a detached perspective view of the combined ferrule and guide.

The improved device is designed for use in connection with the rear runners of sleighs, more particularly of bob sleighs, and is applied to the reach and cross bar portions, the short reach member being represented at 10 and the cross bar or head at 11, the reach bar being provided with a plurality of pin receiving apertures 12 in spaced relation.

At its forward end the reach bar is provided with a ferrule device represented as a whole at 13 which constitutes a support for the bar and also operates as a guide for the extension element. The ferrule device is formed with upper and lower guide loops 15.

The reach bar 10 and head member 11 are supported by a brace element formed of a strap bent into U-shape with its side portions 16 engaging the sides of the bar for a distance and secured to the bar by bolts or rivets 18.

The brace member extends at its bend or head portion 19 over the forward end of the bar 10 and the ferrule 13, the sides 16 branching toward the rear and attached to the head member 11 by passing between the end ferrules 21 of the head and the material of the head.

The extension clevis device comprises a strap bent into elongated U shape with the sides 22 slidably disposed through the loops 15. The terminals of the side portions 22 of the clevis are apertured to receive a pin 23, the latter adapted to engage in the apertures 12 of the bar, and thus enabling the clevis to be adjusted longitudinally of the bar and correspondingly adjust and control the length of the reach, as a whole.

By this means the distance between the forward and rear "bobs" may be changed to any required extent within the range of the clevis and the apertures of the bar.

The ferrule device 13 is an important feature of the device and adds materially to its value and efficiency.

The preferred embodiment of the invention is disclosed in the drawings and set forth in the specification, but it will be understood that any modifications within the scope of the claim may be made in the construction without departing from the principle of the invention or sacrificing any of its advantages.

What I claim is:

A reach device including a transverse head member and a forwardly directed bar, said bar having a plurality of pin receiving apertures in spaced relation, a ferrule device bearing over the forward end of the bar and including upper and lower guide loops, a U-shaped brace bearing over the forward end of the ferrule and the bar and along the sides of the bar and branching laterally and attached to the transverse head member, and a clevis device in elongated U-shape slidable through the loops of said guide member and a pin engaging through the sides of the clevis member and through the apertures of the bar.

In testimony whereof, I affix my signature hereto.

FRED H. BITTNER.